United States Patent [19]

Mazurek et al.

[11] Patent Number: 5,264,278

[45] Date of Patent: Nov. 23, 1993

[54] RADIATION-CURABLE ACRYLATE/SILICONE PRESSURE-SENSITIVE ADHESIVE COATED TAPES ADHERABLE TO PAINT COATED SUBSTRATES

[75] Inventors: Mieczyslaw H. Mazurek, Roseville; David J. Kinning, Woodbury; Steven S. Kantner, St. Paul, all of Minn.

[73] Assignee: Minnesota Mining and Manufacturing Company, St. Paul, Minn.

[21] Appl. No.: 672,356

[22] Filed: Mar. 20, 1991

[51] Int. Cl.$^5$ .................... C09J 7/02; C09J 183/12
[52] U.S. Cl. .................... 428/317.3; 428/317.7; 428/345; 428/355; 525/477; 525/479
[58] Field of Search .............. 428/355, 317.3, 317.7, 428/345; 525/477, 479

[56] References Cited

U.S. PATENT DOCUMENTS

| | | | |
|---|---|---|---|
| 3,577,264 | 4/1971 | Nordstrom | 117/93.31 |
| 3,878,263 | 4/1975 | Martin | 260/825 |
| 4,070,526 | 1/1978 | Colquhoun et al. | 428/537 |
| 4,130,708 | 12/1978 | Friedlander et al. | 528/28 |
| 4,136,250 | 1/1979 | Mueller et al. | 528/29 |
| 4,153,641 | 5/1979 | Deichert et al. | 260/827 |
| 4,158,617 | 6/1979 | Eldred | 204/159 |
| 4,201,808 | 5/1980 | Cully et al. | 428/40 |
| 4,276,402 | 6/1981 | Chromecek et al. | 526/264 |
| 4,293,397 | 10/1981 | Sato et al. | 204/159.13 |
| 4,348,454 | 9/1982 | Eckberg | 428/334 |
| 4,364,972 | 12/1982 | Moon | 427/54.1 |
| 4,369,300 | 1/1983 | Carter et al. | 528/28 |
| 4,391,687 | 7/1983 | Vesley | 204/159.16 |
| 4,477,548 | 10/1984 | Harasta et al. | 430/14 |
| 4,503,208 | 3/1985 | Lin et al. | 528/15 |
| 4,504,629 | 3/1985 | Lien et al. | 525/288 |
| 4,561,950 | 12/1985 | Leo | 522/91 |
| 4,563,539 | 1/1986 | Gornowicz et al. | 556/421 |
| 4,568,566 | 2/1986 | Tolentino | 427/54.1 |
| 4,575,545 | 3/1986 | Nakos et al. | 526/242 |
| 4,575,546 | 3/1986 | Klemarczyk et al. | 526/245 |
| 4,595,471 | 4/1986 | Preiner et al. | 522/29 |
| 4,603,086 | 7/1986 | Fujii et al. | 428/447 |
| 4,774,297 | 9/1988 | Murakami et al. | 525/478 |
| 4,777,276 | 10/1988 | Rasmussen et al. | 556/419 |
| 4,943,620 | 7/1990 | Gomyo et al. | 525/474 |
| 5,091,483 | 2/1992 | Mazurek et al. | 525/477 |

FOREIGN PATENT DOCUMENTS

| | | |
|---|---|---|
| 0152179 | 6/1985 | European Pat. Off. |
| 0170219 | 2/1986 | European Pat. Off. |
| 0176481 | 4/1986 | European Pat. Off. |
| 0250093 | 12/1987 | European Pat. Off. |
| 0280248 | 8/1988 | European Pat. Off. |
| 56-43352 | 4/1981 | Japan |
| 60-26065 | 2/1985 | Japan |
| 60-104158 | 6/1985 | Japan |
| 60-115025 | 6/1985 | Japan |
| 60-190427 | 2/1986 | Japan |
| 61-57355 | 3/1986 | Japan |
| 63-291971 | 11/1988 | Japan |
| WO90/10028 | 9/1990 | PCT Int'l Appl. |
| 1323869 | 7/1973 | United Kingdom |
| 2039287 | 8/1980 | United Kingdom |
| 2109390 | 7/1983 | United Kingdom |

OTHER PUBLICATIONS

X, Yu, S. L. Cooper, et al., *J. Appl. Poly. Sci.*, 30, 2115 (1985).

*Primary Examiner*—Jenna L. Davis
*Attorney, Agent, or Firm*—Gary L. Griswold; Walter N. Kirn; Janice L. Dowdall

[57] ABSTRACT

The present invention provides an acrylate/silicone pressure-sensitive adhesive tape having a foam backing having improved adhesion to painted surfaces and low temperature performance.

29 Claims, No Drawings

RADIATION-CURABLE ACRYLATE/SILICONE PRESSURE-SENSITIVE ADHESIVE COATED TAPES ADHERABLE TO PAINT COATED SUBSTRATES

FIELD OF THE INVENTION

This invention relates to pressure sensitive adhesives and pressure sensitive adhesive (PSA) coated tapes having improved adhesion to paint even at short dwell times and superior low temperature shock resistance.

BACKGROUND OF THE INVENTION

Fastening systems based on pressure sensitive tape constructions are finding increasing utility in numerous applications, as alternatives to mechanical fastening techniques. For example, such tape constructions are used for the attachment of various components, including film graphics, body side molding, body sealing weatherstripping, and most recently, for glass installation. In addition to the automotive industry, there exists many other applications/markets for attachment tapes of this type.

PSA coated tapes based on acrylics, neoprene, polyolefins, polyurethanes, silicones and rubber resin-based materials are currently in use, and provide a generally desirable balance of properties for many purposes However, more demanding applications, such as those in the automotive industry, require materials with a balance of properties not yet available in commercial products. For example, newer automotive paint systems are formulated for enhanced environmental conservation, appearance, durability, and resistance to degradation from common sources of contamination. These formulation changes have also made the paint substrates more difficult to adhere to for conventional PSAs.

In addition, new or potential applications require ever higher performance in tests such as peel adhesion and resistance to shock/impact at low temperatures ($-30°$ to $-45°$ C.). Conventional acrylic-based PSAs lack the desired adhesion and low temperature impact resistance when mounted on these new substrates.

Traditional silicone pressure sensitive adhesives, which by nature exhibit excellent low temperature shock resistance properties, do not generate adequate adhesion to these paints, apparently due to lack of strong interaction with the paint surface. Thus, there exists the need to design new PSAs which possess the required balance of properties.

Attempts have been made to provide "hybrid" systems having the advantages of acrylate PSAs and silicone PSAs, but the approach generally taken has been to blend the two types of PSAs. Thus, these hybrids are prone to gross phase separation problems and their properties are also somewhat limited. In addition, the systems are solvent-based or water-based, necessitating a drying step.

For example, European Patent Publication No. 289928 (General Electric), published Nov. 9, 1988, describes an emulsion or solution comprising: (a) 100 parts by weight of water or organic solvent; (b) from about 10 to about 400 parts by weight of pressure sensitive adhesive comprising: (i) from about 50 to about 99% by weight organic pressure sensitive adhesive, preferably an acrylate, and (ii) from about 1 to about 50% by weight of silicone pressure sensitive adhesive; and (c) an effective amount of organic peroxide or alkoxy silane cross-linking agent to increase the shear strength of the composite adhesive through crosslinking of the silicone. The emulsion generally requires the use of an emulsifying agent or agents to maintain both the micelles of silicone adhesive and micelles of organic adhesive in a substantially stable state of suspension even at low water content, so that drying may be accomplished prior to phase separation of the silicone adhesive and the organic adhesive.

Similarly, U.S. Pat. No. 4,791,163 (Traver et al.) discloses an emulsion (formed from a silicone PSA and an organic PSA, preferably an acrylate) comprising: (a) 100 parts by weight of a continuous phase of water; (b) from about 10 to about 400 parts by weight of micelles comprising: (i) from about 50 to about 99% by weight of micelles comprising organic pressure sensitive adhesive, preferably an acrylate, and (ii) from about 1 to about 50% by weight of micelles comprising silicone pressure sensitive adhesive; and (c) an amount of emulsifying agent effective to maintain the emulsion. Curing of the silicone may be promoted by adding a peroxide or by adding a catalyst and an alkoxy silane.

Japanese Patent Publication No. 62-295982 (Toyota Gosei), published Dec. 23, 1987, describes organic solvent-based blends of silicone pressure sensitive adhesive, active hydrogen containing acrylic pressure sensitive adhesive, and polyurethane and/or polyisocyanate.

Japanese Patent Publication No. 60-197780 (Daicel), published Oct. 7, 1985, also discloses blends in organic solvent of 100 parts by weight acrylic pressure sensitive adhesive and 1-30 parts by weight silicone pressure sensitive adhesive.

Japanese Patent Publication 61-57355 discloses solvent based adhesives having a silicone pressure sensitive adhesive, an acrylate pressure sensitive adhesive, and an organic peroxide crosslinking agent to prevent phase separation. The adhesives mentioned are solvent based adhesives.

Japanese Patent Publication Nos. 59-145269 (Nitto), published Aug. 20, 1984, and 63-291971 (Nitto), published Nov. 29, 1988, seek to avoid the gross phase separation problems characteristic of blends through the use of either bridging agents or compatibilizing agents. The former patent describes a composition comprising a medium, 100 parts by weight of acrylic adhesive polymer dissolved or dispersed in the medium, 5-120 parts by weight silicone adhesive polymer, and crosslinking agent capable of co-bridging both polymers. The latter patent discloses pressure sensitive adhesives comprising silicone pressure sensitive adhesive, polyacrylate pressure sensitive adhesive, and silicone polyacrylate graft copolymer.

These adhesives have been used for various automotive applications, e.g., attachment of decorative items to the painted surface. Automotive industry testing of adhesives typically subjects adhesives to pass a shock test, known in the industry as a "cold slam" test, at temperatures down to $-45°$ C. Conventional acrylate adhesives have difficulty passing such tests when attached to new high solids paints systems which are increasingly used in the automotive industry. Adhesion to such paints is also reduced as compared to older paints.

Additional patents disclose ultraviolet radiation curing of acrylate adhesives. U.S. Pat. No. 4,364,972 (Moon) discloses the use of N-vinyl-2-pyrrolidone as the polar copolymerizable monomer in the acrylate adhesive copolymer. High adhesion to automotive paints is disclosed but not exemplified.

A need exits for a PSA and a PSA coated tape having superior adhesion to paint and superior low temperature shock resistance properties. A need also exists for a hybrid PSA system and a paint-adherable tape coated with a hybrid PSA system which has the advantages of both acrylate PSAs and silicone PSAs which requires little or no solvent, thereby reducing or eliminating the environmental and health hazards associated with solvent use, as well as the need for drying. A need also exists for such a hybrid PSA system paint-adherable tape coated with a hybrid PSA system which is radiation curable and which, unlike most known hybrid systems, is not prone to gross phase separation problems. A need also exists for a hybrid PSA system and a paint-adherable tape coated with a hybrid PSA system which possesses balanced PSA properties tailorable over a wide range, thereby providing greater flexibility than known hybrid systems in achieving substrate-specific adhesion. We have discovered such a PSA and such a PSA coated tape.

SUMMARY OF THE INVENTION

We have discovered a PSA coated tape that is advantageous in that it exhibits both improved adhesion to paint surfaces and "cold slam" performance particularly at short dwell times without loss of other critical properties. The tape comprises a foam substrate coated with a hybrid PSA system which combines the advantages of both silicone and acrylate PSAs and which does not experience the phase separation problems which have plagued blended systems. The hybrid PSA system is environmentally advantageous in that the amount of solvent employed is drastically reduced or altogether eliminated which is also advantageous in terms of the reduction of potential health hazards typically associated with the use of such solvents. The system is also advantageous in that it can be prepared by the radiation curing of the PSA composition of the invention and in that the drying step can be shortened or eliminated due to the solvent reduction or elimination, respectively. The PSA system possesses balanced PSA properties tailorable over a wide range, thus providing greater flexibility than known systems in achieving painted substrate-specific adhesion.

The present invention provides a pressure sensitive adhesive tape comprising:

(a) a pressure sensitive adhesive layer comprising a polymerized pressure sensitive adhesive composition wherein said pressure sensitive adhesive composition comprises:

(I) about 25 to about 99 weight percent of polymer of the formula

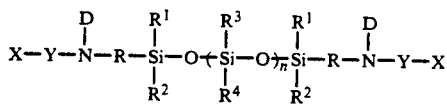

I wherein:

X are monovalent moieties having ethylenic unsaturation which can be the same or different;

Y are divalent linking groups which can be the same or different;

D are monovalent moieties which can be the same or different selected from the group consisting of hydrogen, an alkyl group of 1 to about 10 carbon atoms, aryl, and substituted aryl;

R are divalent hydrocarbon groups which can be the same or different;

$R^1$ are monovalent moieties which can be the same or different selected from the group consisting of alkyl, substituted alkyl, aryl, and substituted aryl;

$R^2$ are monovalent moieties which can be the same or different selected from the group consisting of alkyl, substituted alkyl, aryl, and substituted aryl;

$R^3$ are monovalent moieties which can be the same or different selected from the group consisting of alkyl, substituted alkyl, vinyl, aryl, and substituted aryl;

$R^4$ are monovalent moieties which can be the same or different selected from the group consisting of alkyl, substituted alkyl, vinyl, aryl, and substituted aryl;

n is an integer of about 200 to about 1000;

(II) about 1 to about 75 weight percent free radically polymerizable vinyl monomer which is capable of copolymerizing with the polymer wherein the free radically polymerizable monomer comprises:

(i) about 5 to about 100 parts by weight of an acidic monomer selected from the group consisting of methacrylic acid, acrylic acid, and mixtures thereof;

(ii) correspondingly about 0 to about 95 parts by weight of a non-acidic acrylate monomer selected from the group consisting of esters of acrylic acid comprising 5 to 21 carbon atoms; based upon 100 parts total by weight of said free radically polymerizable monomer;

wherein the weight percentages set forth in elements (I) and (II) are based upon the total weight of the polymer of element (I) plus the monomer of element (II); and (III) a sufficient amount of a silicate MQ tackifying resin to impart a degree of adhesive tack to the cured composition at the use temperature; and (b) a foam layer which is coated on at least one side with the adhesive layer.

The invention also provides a PSA composition and PSA having improved adhesion to the newer automotive paints and superior low temperature shock resistance.

The adhesive has at least a first phase and a second phase. The first phase consists primarily of silicone polymer and preferably is a continuous phase. The second phase consists primarily of acrylic polymer segments.

The radiation-curable PSA composition can further comprise one or more of the following: crosslinker in the form of one or more multifunctional acrylate monomers, crosslinker in the form of one or more organopolysiloxanes according to the formula

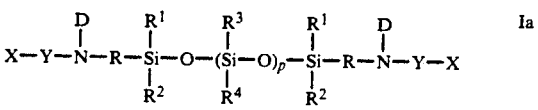

Ia wherein p is an integer of about 35 to about 199, and X, Y, D, R, $R^1$, $R^2$, $R^3$ and $R^4$ are as defined above; initiator; filler; solvent; and a tackifying resin for the vinyl phase ultimately formed from the free radically polymerizable vinyl monomer.

Copolymerization of free radically polymerizable vinyl, preferably acrylate, monomer(s) and terminally difunctional, i.e., telechelic, silicone(s) produces a hybrid vinyl/siloxane PSA which does not have the gross phase separation problems of most known PSA blends. Since the two components are chemically bound, a microphase separated domain morphology results, which can be reliably produced and which has enhanced stability relative to known blends of two or more immiscible polymers Since gross phase separation does not occur, the hybrid PSAs used for the tapes of the invention avoid problems which are characteristic of the known blends, e.g., lack of reproducibility in application of the coating solution, product variability resulting from a dependence of morphology on drying rate, and changes in product performance after coating and drying due to rearrangement of domain structure, both in the bulk and at the surface, with aging.

The properties of the PSA composition can be tailored through variation in the nature(s) and amount(s) of the free radically polymerizable monomer(s) and in the molecular weight(s) and amount(s) of difunctional silicone(s). Thus, in comparison with known systems, this invention provides increased flexibility in achieving good adhesion to specific surfaces such as the newer paints being used in the automotive industry. Other advantages of the hybrid PSA composition used in the tapes of the present invention include reduction or elimination of solvent and, thus, of drying procedures, and, as a radiation-curable system, the ability to cure without damage to heat sensitive substrates.

The pressure-sensitive adhesive tapes of the invention comprise a foam layer, preferably an acrylic foam layer. In a highly preferred embodiment, the foam layer contains an ultraviolet-radiation polymerized acrylic copolymer of monomers containing a) from about 80 parts to about 99 parts of an alkyl acrylate monomer, the alkyl groups of which have an average of 4 to 14 carbon atoms, and b) correspondingly, from about 20 parts to about 1 part of a monoethylenically unsaturated strongly polar copolymerizable monomer; based upon 100 parts by weight total monomer.

DETAILED DESCRIPTION OF THE INVENTION

Silicone Polymer

Telechelic silicones suitable for use in the PSA composition and tape of the invention are those represented by Formula I above, which can be prepared by reaction of an organopolysiloxane diamine represented by the general formula

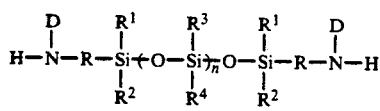

where $n, R, R^1, R^2, R^3, R^4$, and D are as defined above, with an electrophile having ethylenic unsaturation, X, and such other functionality that, upon reaction with the organopolysiloxane diamine, not only a terminal X group but also an amide, substituted amine, urea, or urethane moiety is provided. Examples of the types of functionality required in such electrophilic compounds include acid halide, acid anhydride, cyclic anhydride, and azlactones, each of which provides an amide moiety upon reaction with the diamine, epoxy or acrylate, each of which provides a substituted amine moiety, and isocyanate, which provides a urea moiety.

Preferably, X comprises

wherein $R^5$ is selected from the group consisting of hydrogen and —COOH and $R^6$ is selected from the group consisting of hydrogen, methyl, and —CH$_2$COOH. Most preferably, $R^5$ comprises hydrogen and $R^6$ is selected from the group consisting of hydrogen and methyl. The reaction can be carried out at a temperature of about $-10°$ C. to about 50° C. and under atmospheric pressure by combining the diamine and the electrophile while providing appropriate mixing. A nonreactive organic solvent can be used as a diluent but is not necessary, and the two reactants can be charged into the reaction vessel in any order. Alternatively, an organopolysiloxane diamine according to Formula II above can be reacted first with a compound containing two electrophilic groups, e.g., a diisocyanate, (or with a compound such as phosgene) and the resultant product reacted in a second step with a nucleophile, e.g., an amine or an alcohol, to provide terminally difunctional silicone according to Formula I. When an alcohol such as hydroxyethyl acrylate, hydroxyethyl methacrylate, or hydroxypropyl methacrylate is utilized, the product organopolysiloxane contains urethane moieties.

Organopolysiloxane diamines useful in the preparation of the telechelic silicones can be prepared in various ways. In a first method, an organopolysiloxane terminated at both chain ends with hydroxy groups, as represented by the general formula

where $R^3$, $R^4$, and n are as defined above, can be subjected to a condensation reaction with a compound represented by the general formula

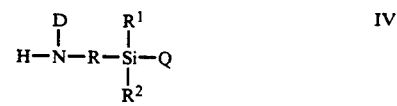

where D, R, $R^1$, and $R^2$ are as defined above and Q is a hydroxy group or a hydrolyzable group. A second method involves the reaction of a cyclic organosiloxane, represented by the general formula

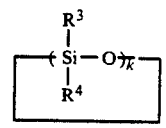

where $R^3$ and $R^4$ are as defined above and k is a positive integer of 3 to 8, with an amine functional endblocker, represented by the general formula

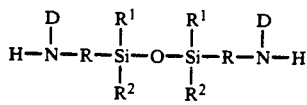

where D, R, R¹, and R² are as defined above, in the presence of a basic catalyst such as tetramethylammonium hydroxide or triorganosilanolate. A third method, a modification of the second, is preferred and involves running the reaction in two stages utilizing a minimum amount of an essentially anhydrous amino alkyl functional silanolate catalyst represented by the general formula

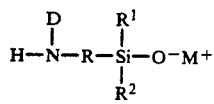

where D, R, R¹, and R² are as defined above and M is a cation selected from the group consisting of K⁺, Na⁺, and tetraorganoammonium ion, with $N(CH_3)_4^+$ being preferred. In the first stage of the reaction, a low molecular weight organopolysiloxane diamine, represented by the general formula

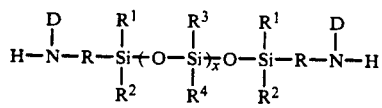

where D, R, R¹, R², R³, and R⁴ are as defined above and x is an integer of about 4 to about 40, is prepared by reacting an amine functional disiloxane endblocker represented by Formula VI above with a cyclic organosiloxane represented by Formula V in the presence of a catalytic amount of essentially anhydrous amino alkyl functional silanolate represented by Formula VII in an inert atmosphere such as nitrogen or argon. The preferred catalyst for use in this reaction is 3-aminopropyl dimethyl tetramethylammonium silanolate, which can be obtained as a crystalline solid from the reaction of one molar equivalent of 1,3-bis(3-aminopropyl) tetramethyldisiloxane with two molar equivalents of tetramethylammonium hydroxide pentahydrate in tetrahydrofuran under reflux, followed by drying under vacuum (0.1 mm Hg) for five hours at 60° C. The amount of catalyst employed should be less than about 0.05 percent, preferably about 0.005 to about 0.03 percent, by weight of the resultant organopolysiloxane diamine of Formula II. The reaction can be carried out in bulk at a temperature of 80°-90° C., and under these conditions is usually complete in about 0.5-2 hours, as judged by substantially complete disappearance of the endblocker in the reaction mixture as determined by vapor phase chromatography. The second stage of the reaction involves the slow addition of the remainder of the cyclic organosiloxane required to achieve the desired molecular weight. This addition is preferably carried out dropwise at such a rate that the cyclic organosiloxane is incorporated into the polymer about as fast as it is added, usually in about five to seven hours at the reaction temperature of 80°-90° C. By utilizing this two-stage method with a minimum amount of essentially anhydrous catalyst, organopolysiloxane diamines represented by Formula II above can be consistently prepared having excellent difunctionality with little contamination from monofunctional and nonfunctional polysiloxane impurities.

Preferred organopolysiloxane diamines for use in preparing the telechelic silicones are those for which n is an integer of about 270 to about 700, R is selected from the group consisting of alkylene of one to about twelve carbon atoms, alkylarylene, and arylene, R¹ and R² are independently selected from the group consisting of alkyl of one to about twelve carbon atoms, substituted alkyl of one to about twelve carbon atoms, aryl, and substituted aryl, R³ and R⁴ are at least 50% methyl with any remainder independently selected from the group consisting of alkyl of two to about twelve carbon atoms, substituted alkyl of two to about twelve carbon atoms, vinyl, aryl, and substituted aryl, and D is hydrogen. Such a range of molecular weights provides the best balance of properties in the PSA compositions. Most preferably, R is alkylene of one to about twelve carbon atoms and R¹, R², R³, and R⁴ are methyl, as polydimethylsiloxanes are the most readily available, the most inert, and provide the greatest adhesion to low energy surfaces.

Examples of electrophiles suitable for reaction with organopolysiloxane diamines to produce the telechelic silicones useful in the invention include but are not limited to isocyanatoethyl methacrylate, alkenyl azlactones such as vinyl dimethyl azlactone and isopropenyl dimethyl azlactone, m-isopropenyl-α, α-dimethyl benzyl isocyanate, glycidyl methacrylate, acryloyl ethyl carbonic anhydride, maleic anhydride, and multifunctional acrylates such as hexanediol diacrylate and trimethylolpropane triacrylate. Some electrophiles, e.g., isocyanatoethyl methacrylate, are commercially available, and others can be prepared via literature methods Alkenyl azlactones and their preparation are described in U.S. Pat. No. 4,777,276 (Rasmussen et al.), the disclosure of which is incorporated herein by reference. Acryloyl ethyl carbonic anhydride can be prepared from ethyl chloroformate and acrylic acid by the method of R. Hatada and H. Kondo given in *Bull. Chem. Soc. Japan* 41 (10), 2521(1968), the disclosure of which is also incorporated herein by reference. Conditions for reaction of amines with multifunctional acrylates in a Michael addition reaction are described in U.S. Pat. No. 4,603,086 incorporated herein by reference. Preferred electrophiles are those which react under relatively mild conditions with the organopolysiloxane diamine and include those selected from the group consisting of isocyanatoethyl methacrylate, m-isopropenyl-α,α-dimethylbenzyl isocyanate, vinyl dimethyl azlactone, acryloyl ethyl carbonic anhydride, and maleic anhydride.

A preferred telechelic silicone for use in the PSA composition comprises the organopolysiloxane of Formula I wherein X comprises

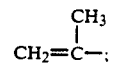

Y comprises

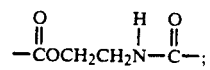

D=H; R comprises —CH₂CH₂CH₂—; and R¹, R², R³ and R⁴ each comprise —CH₃.

Another preferred organopolysiloxane comprises the organopolysiloxane of Formula I wherein X comprises CH₂=CH—; Y comprises

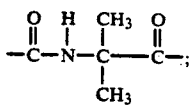

D=H, R comprises —CH₂:CH₂:CH₂—; and R¹, R², R³ and R⁴ each comprise —CH₃.

Another preferred organopolysiloxane comprises the organopolysiloxane of Formula I wherein X comprises CH₂=CH—,

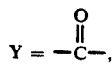

D=H, R comprises —CH₂CH₂CH₂—; and R¹, R², R³ and R⁴ each comprise —CH₃.

Preferably, the organopolysiloxane comprises the organopolysiloxane of Formula I wherein n is an integer of about 450 to about 750 in order to obtain superior adhesive properties.

Free Radically Polymerizable Vinyl Monomer

Monofunctional free radically polymerizable vinyl monomers suitable for use in the PSA compositions are those which can copolymerize with the telechelic silicones.

The acidic copolymerizable monomer is selected from strongly polar monomers such as acrylic acid, methacrylic acid, and mixtures thereof. The level of acidic monomer is critical to the compositions of the adhesive layers. If the level of the acidic monomer is too low, the peel adhesion of the adhesive to painted surfaces is not sufficient. If the level of the acidic monomer is too high, the adhesive has low tack. The acidic monomer comprises from about 1 to about 20 weight percent for reasons of improved adhesion to paint, preferably from about 1 to about 10 weight percent for reasons of more improved adhesion to paint, most preferably about 2 to about 5 weight percent of the pressure sensitive adhesive composition for reasons of improving adhesion to paint without compromising tack.

The free radically polymerizable vinyl monomer can optionally further comprise non-acidic acrylate monomer selected from the group consisting of esters of acrylic acid comprising 4 to 21 carbon atoms and esters of methacrylic acid comprising 5 to 21 carbon atoms. The non-acidic acrylate monomer, if included, preferably comprises non-acidic monomer selected from the group consisting of methyl acrylate, ethyl acrylate, propyl acrylate, butyl acrylate, hexyl acrylate, heptyl acrylate, isooctyl acrylate, and mixtures thereof. Most preferably, the non-acidic monomer is isooctyl acrylate for best adhesive performance.

The free radically polymerizable monomer can comprise about 10 to about 100 parts by weight acidic monomer and correspondingly about 0 to about 90 parts by weight acrylate monomer based upon 100 parts by weight free radically polymerizable monomer.

One preferred monomer combination is wherein the free radically polymerizable monomer comprises about 5 to about 15 parts by weight acidic monomer and correspondingly about 95 to about 85 parts by weight acrylate monomer.

A second preferred monomer combination is wherein the free radically polymerizable monomer comprises about 95 to about 100 parts by weight acidic monomer and correspondingly about 5 to about 0 parts by weight acrylate monomer.

A most preferred monomer selection is wherein the free radically polymerizable monomer comprises about 100 parts by weight acidic monomer.

The radiation curable PSA composition can be prepared by combining about 25 to about 99 percent by weight, preferably about 80 to about 95 percent by weight of one or more telechelic silicones represented by Formula I above, and from about 1 to about 75 percent by weight, preferably about 5 to about 20 percent by weight, of one or more monofunctional free radically polymerizable vinyl monomers, and a sufficient amount of a silicate MQ tackifying resin to impart to the cured composition a degree of adhesive tack at the use temperature, e.g., from about 80 to about 200 parts per weight resin for reasons of good adhesion, preferably about 80 to about 150 parts for reasons of better adhesion, most preferably about 90 to about 120 parts for reasons of superior adhesion, per 100 parts by weight telechelic silicone. Such resins are disclosed in U.S. Pat. Nos. 4,370,358; 3,983,298; 2,676,182; 2,736,721; and 4,791,163; all which are incorporated by reference herein, and are commercially available as approximately 50 to 60 weight percent solutions in solvents such as toluene or xylene.

The vinyl monomers and telechelic silicones can be added to the MQ resin solution to provide a high solids, e.g., a 60–80 weight percent solids, composition which can be coated on a substrate, cured by exposure to electron beam, visible, or ultraviolet radiation, and then dried to effect solvent removal. Alternatively, the drying step can precede the curing step either before or after coating, provided that the vinyl monomers are less volatile than the solvent. In the former case, a 100% solids composition is obtained which can then be coated or extruded and cured. A 100% solids composition can also be obtained by stripping the solvent from the MQ resin, combining the MQ resin and the vinyl monomer(s), and then adding the telechelic silicone, or by diluting the MQ resin solution with low volatility vinyl monomer and distilling or vacuum stripping the solvent either before or after adding the telechelic silicone.

Curing of the PSA composition in the presence of solvent, e.g., the MQ resin solvent or, optionally, other solvent, can enhance the miscibility of the telechelic silicone/MQ resin/vinyl monomer mixture, leading to improved copolymerization, and can also affect the PSA properties. By varying the amount of solvent, i.e., varying the degree of swelling, controlled variation in PSA properties can be achieved.

Suitable solvents include those which do not interfere with the polymerization of the polymer of Formula I and the vinyl monomer. Examples of suitable solvents include ethyl acetate, cyclohexane, hexane, heptane, toluene, butyl acetate, octamethylcyclotetrasiloxane, and the like. Nonprotic solvents are preferred.

Curing of the hybrid PSA composition should be carried out in as oxygen-free an environment as possible, e.g., in an inert atmosphere such as nitrogen gas or by utilizing a barrier of radiation-transparent material having low oxygen permeability. When visible or ultraviolet radiation is used for curing, the composition also contains photoinitiator. Suitable photoinitiators include benzoin ethers, benzophenone and derivatives thereof, acetophenone derivatives, camphorquinone, and the like. Benzoin ethers such as benzoin methyl ether or benzoin isopropyl ether, substituted benzoin ethers such as anisole methyl ether, substituted acetophenones such as 2,2-diethyoxyacetophenone and 2,2-dimethoxy-2-phenylacetophenone, substituted alpha-ketols such as 2-methyl-2-hydroxypropiophenone, aromatic sulfonyl chlorides such as 2-naphthalene sulfonyl chloride, and photoactive oximes such as 1-phenyl-1,1-propanedione-2-(0-ethoxycarbonyl)-oxime. Initiator is generally used at a concentration of from about 0.1% to about 5% by weight of the total polymerizable composition. If desired, the PSA composition can also be cured thermally, requiring the use of thermal initiator, such as peroxides, azo compounds, or persulfates, generally at a concentration of from about 0.1% to about 5% by weight of the adhesive composition.

In addition to the technique of curing in a swollen state, controlled variation of PSA properties can be achieved by including crosslinker(s) in the PSA composition. The adhesive composition can optionally further comprise low molecular weight difunctional silicone. Low molecular weight difunctional organopolysiloxane represented by Formula Ia above can be utilized as crosslinker, and desired properties can then be obtained via variation in the nature, molecular weight, and amount of the material added. Such low molecular weight difunctional silicone can be prepared by the methods described above and, when included in the PSA composition, serves to modify the crosslink density and, thereby, the peel and shear adhesion characteristics of the cured composition. Preferably, the amount of low molecular weight difunctional silicone does not exceed about 30 weight percent, of the total weight of the adhesive composition. When utilized, the amount of low molecular weight difunctional silicone preferably comprises from about 2 to about 30 weight percent, most preferably from about 5 to about 20 weight percent, of the adhesive composition. One or more multifunctional acrylates such as 1,6-hexanediol diacrylate, 1,4-butanediol diacrylate, trimethylolpropane triacrylate, 1,6-hexanediol dimethacrylate, pentaerythritol tetraacrylate, 1,2-ethylene glycol diacrylate, and 1,2-dodecanediol diacryalte can also be used as crosslinker, alone or in combination with low molecular weight silicone. Other useful crosslinking agents include the substituted triazines, such as those disclosed in U.S. Pat. Nos. 4,329,384 and 4,330,590 (Vesley), both incorporated herein by reference, e.g., 2,4-bis(trichloromethyl)-6-p-methoxystyrene-5-triazine and the chromophore halomethyl-5-triazines. The term "multifunctional" as used herein to describe a compound refers to a compound having at least two functional groups. The amount of acrylate crosslinker preferably does not exceed about 2 weight percent, of the PSA composition. When utilized, the amount of acrylate crosslinker preferably comprises from about 0.05 to about 2 weight percent, most preferably about 0.05 to about 0.5 weight percent, of the total weight of the adhesive composition. If the concentration of crosslinker is too high, the cured PSA composition has a high crosslink density (low molecular weight between crosslinks), resulting in poor tack and peel adhesion properties.

When utilized, the addition of up to about 30 weight percent, preferably from about 2 to about 30 weight percent, more preferably about 2 to about 20 weight percent, and most preferably about 5 to about 15 weight percent, monofunctional siloxane macromolecular monomer, represented by Formula IX below wherein q is an integer of 0 or 1, s is an integer of 1, 2, or 3, r is an integer of about 35 to about 700, $R^7$ is alkyl, substituted alkyl, alkoxy, alkylamino, hydroxyl, aryl, or substituted aryl, and X, Y, D, R, $R^2$, $R^3$, and $R^4$ are as defined above, alone or in combination with low molecular weight difunctional silicone, yields PSAs with increased tack, i.e., improved "finger appeal".

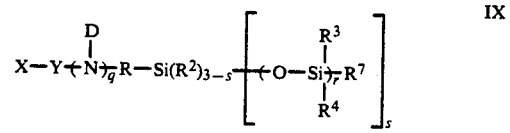

The hybrid PSA composition of the invention can be frothed to make a foam, using an inert gas such as nitrogen in order to form a hybrid PSA composition having gas bubbles dispersed throughout. A foam-like appearance can also be obtained by addition of fillers such as glass or plastic microbubbles. The composition can also contain a filler such as a silica filler for modification of PSA properties, e.g., at levels up to about 15 percent by weight of the total adhesive composition preferably about 0.5 to about 15 weight percent, most preferably about 0.5 to about 5 weight percent. Either hydrophilic or hydrophobic silica can be utilized, but hydrophobic silica is preferred due to its reduced tendency to "structure", i.e., to hydrogen bond with the polysiloxane and form an elastic mass prior to cure. Such structuring can impede normal processing operations such as extrusion. An especially useful filler material is hydrophobic silica as disclosed in U.S. Pat. Nos. 4,710,536 and 4,749,590, (Klingen, et al.), both of which are incorporated herein by reference.

Other common non-copolymerizable additives such as pigments, dyes, quartz powder, glass fibers, calcium carbonate, flame retardants, thermal stabilizers, polymerization inhibitors, plasticizers, adhesion promoters, tackifiers, fibrous reinforcing agents, woven and nonwoven fabrics, foaming agents, antioxidants, viscosity adjusting agents, and the like can also be included in the PSA composition.

If desired, tackifier for the vinyl phase can be included to further modify the properties of the cured PSA. When utilized, the tackifier typically comprises up to about 100 parts by weight, more preferably about 5 to about 100 parts by weight, and most preferably from about 10 to about 70 parts by weight, per 100 parts by weight of the vinyl component (free radically polymerizable monomer). Examples of such tackifiers include rosin acids, rosin esters, synthetic aromatic resins, synthetic aliphatic resins, terpene resins, and mixtures thereof.

It is believed that the addition of the silicone polymer(s) to acrylic monomers yields upon cure a microphase-separated pressure-sensitive adhesive wherein the silicone phase is a continuous phase and the acrylic polymer segment phase exists as relatively uniform inclusions ranging in size from about 0.01 micrometer to about 1 micrometer. A pressure-sensitive adhesive tape having an adhesive layer comprising such a composition provides substantial improvement in both peel adhesion to painted surfaces and cold slam properties while maintaining acceptable values for other adhesive properties such as shear.

The pressure-sensitive adhesive tapes of the invention exhibit significantly improved adhesion to the newer automotive paints. Such paints include those that are high solids paint systems designed to reduce pollution, and retain durable high gloss finishes. They have surfaces which are less reactive with various pollutants in the air, and also have a lower affinity to adhesives. Conventional adhesives have greatly reduced adhesion to such paints as compared to older paint formulations. Some examples of newer types of automotive paint include BASF/Inmont paints "E-14" and "E-176", DuPont paints "M337-100" and "RK-3840", Ford paint "50-J", and Asahi Chemical Co Ltd. paint "Lumiflon".

Preferred pressure-sensitive adhesive compositions of the invention also exhibit improved cold temperature performance when subjected to "cold slam" testing at temperatures of between −30° C. and −45° C.

When the cured adhesive is examined by Transmission electron microscopy (TEM), the microphase-separated morphology is clearly visible. The silicone phase is continuous, and the acrylic phase exists as uniform inclusions of about 0.01 to about 1 micrometer in size.

Without wishing to be bound by theory, it is believed that these pressure-sensitive adhesive tapes exhibit improvements in automotive paint adhesion and cold slam because their unique morphologies provides for the efficient damping and conformability of the silicone in the continuous phase, and the excellent chemical interaction of the acrylic polymer segments containing acid with painted substrates.

The tapes of the invention have a substrate comprising a foam layer. The foam layer may consist of such materials as acrylates, polyethylenes, polypropylenes, neoprenes, polyolefins, polyurethanes, silicones, etc.

In a preferred embodiment, the foam layer consists of an ultraviolet-radiation polymerized acrylic copolymer which may incorporate similar or dissimilar acrylic monomers in like or unlike thicknesses, having similar or different additives from those acrylic polymer segments contained in the adhesive layer. The foam layer preferably comprises about 80 parts, to about 99 parts by weight of an alkyl acrylate monomer, the alkyl group of which are an average of 4 to 14 carbon atoms and correspondingly, about 20 parts, to about 1 part by weight of a strongly polar copolymerizable monomer, based upon 100 parts by weight of alkyl acrylate monomer plus polar monomer.

Such alkyl acrylate monomers include, e.g., isooctyl acrylate, 2-ethyl hexyl acrylate, isononyl acrylate, decyl acrylate, dodecyl acrylate, butyl acrylate, hexyl acrylate, and the like.

The polar copolymerizable monomer which the preferred foam layer can comprise is selected from strongly polar monomers such as acrylic acid, acrylamide, itaconic acid, hydroxyalkyl acrylates, or substituted acrylamides or moderately polar monomers such as N-vinyl-2-pyrrolidone, N-vinyl caprolactam, and acrylonitrile.

The foam layer can comprise microspheres. The microspheres may be glass or polymeric. The microspheres may have an average diameter of 10 to 200 micrometers, and comprise from about 5 to about 65 volume percent of the foam layer. The thickness of the foam layer in preferred tapes of the invention range from 0.3 mm to about 4.0 mm in thickness.

Especially preferred microspheres are polymeric microspheres, such as those described in U.S. Pat. Nos. 3,615,972, 4,075,238, and 4,287,308, all of which are incorporated herein by reference. The microspheres are available from the Pierce & Stevens Company under the trade name "Microlite" in unexpanded form and "Miralite" in expanded form. Similar microspheres are available from Kema Nord Plastics under the trade name "Expancel" and from Matsumoto Yushi Seiyaku under the trade name "Micropearl". In expanded form, the microspheres have a specific density of approximately 0.02-0.036 g/cc. It is possible to include the unexpanded microspheres in the foam layer and subsequently heat them to cause expansion, but it is generally preferred to mix in the expanded microspheres. This process ensures that the hollow microspheres in the final layer are substantially surrounded by at least a thin layer of adhesive.

Preferred glass microspheres have average diameters of about 80 micrometers. When glass microspheres are used, the pressure-sensitive adhesive layer should be at least 3 times as thick as their diameter, preferably at least 7 times. The thickness of layers containing such glass microspheres should be at least six times, preferably at least twenty times that of each microsphere-free layer.

Other useful materials which can be blended into the foam layer in addition to the pressure sensitive adhesive layer include, but are not limited to, fillers (including the ones disclosed with respect to the adhesive), pigments, plasticizers, tackifiers, fibrous reinforcing agents, woven and nonwoven fabrics, foaming agents, antioxidants, stabilizers, fire retardants, and viscosity adjusting agents.

The pressure-sensitive adhesive composition is preferably prepared by dissolving or dispersing the silicone polymer I and MQ resin into the alkyl acrylate monomer if used, and then adding the acidic copolymerizable monomer, and initiator. Optional crosslinking agent or other additives may also be incorporated into the syrup. The hybrid PSA composition depending on its viscosity, can be coated via any of a variety of conventional coating methods, such as roll coating, knife coating, or curtain coating, or can be extruded.

The composition can be coated onto a flexible carrier web and polymerized in an inert, i.e., a substantially oxygen-free, atmosphere, or a nitrogen atmosphere. A sufficiently inert atmosphere can be achieved by covering a layer of the photoactive coating with a plastic film which is substantially transparent to ultraviolet radiation, and irradiating through that film in air using fluorescent-type ultraviolet lamps. If, instead of covering the polymerizable coating, the photopolymerization is to be carried out in an inert atmosphere, the permissible oxygen content of the inert atmosphere can be increased by mixing into the polymerizable monomer an oxidizable tin compound as taught in U.S. Pat. No. 4,303,485 (Levens), incorporated herein by reference, which also teaches that such procedures will allow thick coatings to be polymerized in air.

The silicone polymer and MQ resin appear to be soluble in the ultraviolet-radiation polymerizable monomers when originally mixed. As the monomers are reacted on the carrier web, the silicone polymer and MQ resin become less miscible with the growing acrylic copolymer resulting in microphase-separation. Because silicone polymers having at least one unsaturated moiety are used, chemical crosslinking/grafting between the polymer chains and the unsaturated segments hinders large scale rearrangement of the initial phase separated structure, resulting in a high level of interconnectivity of the phases and the unique morphologies and resulting properties observed for these systems.

The adhesive composition of the invention is typically cured and applied by first making a tape construction which comprises a layer of adhesive composition evenly coated between two liners at least one of which is coated with a release material. A transfer tape can be made by coating the adhesive composition between two liners both of which are coated with a release coating. The release liners typically comprise a clear polymeric material such as polyester that is transparent to ultraviolet radiation. Preferably, each release liner is first coated or primed with a release material which is incompatible with the silicone containing adhesive of the invention.

The release liners useful in the practice of this invention are those that are suitable for use with silicone pressure-sensitive adhesives and organic pressure-sensitive adhesives. An example of a useful composition is disclosed in copending U.S. application Ser. No. 07/450,623, assigned to the assignee of the present case, incorporated by reference herein. Another useful release coating composition that can be used to make a suitable release liner is described in European Patent Publication No. 378420, U.S. Pat. No. 4,889,753, and European Patent Publication No. 311262, all incorporated by reference herein. Release liners and compositions are also commercially available. Useful commercially available release coatings include Dow Corning® Syl-off™ 7610 polydimethylsiloxane release coating and Q2-7785; Shin-Etsu X-70-029NS fluorosilicone release coatings; and the like.

The adhesive compositions of the invention can also be coated onto a differential release liner, i.e. a release liner having a first release coating coated on one side of the liner and a second release coating coated on the opposite side of the liner. The two release coatings have different release values. For example, one release coating may have a release value of 5 grams/cm, i.e. 5 grams of force to remove a strip of adhesive 1 cm wide from the coating, and the second release coating may have a release value of 15 grams/cm. The adhesive is typically coated onto the side of the release liner coated with the release coating having the higher release value and the resulting tape can be wound into a roll. As the tape is unwound, the adhesive remains adhered to the release coating with the higher release value. After the tape is applied to a substrate, the release liner can be removed to expose an adhesive surface for further use.

The adhesive composition is typically cured by exposure to ultraviolet radiation which is transmitted through the release liner(s). When a transfer tape is made, one of the liners of the transfer tape can be removed and the exposed adhesive surface can be laminated to another substrate such as a backing. The remaining release liner aids in transferring the adhesive to the substrate. The substrate can be any of the typical substrates used for tapes such as those selected from the group consisting of polymeric films (e.g. polyester, polypropylene, polyurethane) metal foils, paper, cloth, nonwovens, foam sheets, and the like. Foam sheets are known in the industry and include open and closed cell foams made from polyethylene, polyurethane, acrylates, polystyrene, neoprene, silicone, and the like.

In preparing a tape construction adherable to automotive paints, one release liner of a transfer tape is typically removed and the exposed adhesive layer is firmly contacted and adhered to a foam layer material such as those discussed above. Useful foam layer materials typically have thicknesses of about 0.3mm to about 4mm. The thickness of the foam layer can vary, depending upon the intended application. Foam layers are especially useful to provide damping properties. The opposite side of the foam layer is typically coated with a conventional pressure-sensitive adhesive that adheres well to an auto body side molding, etc. Such adhesives are disclosed in Re 24,901, incorporated by reference herein. The remaining release liner which carries the adhesive of the invention can be removed for application of the adhesive coated foam layer, having a body side molding, etc. firmly adhered to its opposite side, to a painted car door, etc.

Testing Procedures

The following tests have been used to evaluate adhesives of the invention. All percentages, parts and ratios throughout the specification, including the examples and the claims are by weight unless specifically stated otherwise.

Analysis of Adhesive Morphology by Transmission Electron Microscopy

Thin sections (500-1000 Angstroms) for TEM testing were prepared at a sample temperature of $-140°$ C. using a Reichert-Jung® Ultracut E® ultramicrotome equipped with an FC4 cryoattachment. A Diatome® diamond knife with a stainless steel boat was employed. The sections were floated off onto n-propanol and collected on 700 mesh copper grids. The sections were then examined using a JEOL 100 CX electron microscope in transmission mode operated at 100 kV.

90° Peel Adhesion

A strip of anodized aluminum 19 mm×200 mm×0.125 mm is positioned on one adhesive face of the tape sample. Pressure is applied to the aluminum by rolling with a 2 kg roller. The opposite face of the sample is then firmly bonded to a rigid painted substrate. After the specified dwell time, the sample is removed by pulling the aluminum strip at 90° to the adhesive surface at a speed of 30.5 cm/minute, noting the average adhesion in N/dm width, and the failure mode. Foam split (FS) is the most desirable failure mode as it indicates adhesion to the substrate is stronger than the internal strength of the core layer.

Cold Slam

A rigid vertical steel frame approximately 40 cm square is provided at its upper edge with a similar dimensioned hinged frame/door. 19.4 square cm (2.54 cm×7.62 cm) of medium density silicone foam is mounted at the lower outer edge of the fixed vertical frame (where the hinged door impacts when slammed).

Test panels are prepared as follows:

A 12.7 mm×125 mm pressure sensitive attachment tape, the preparation of which is described in the Examples, carried on a release liner, is applied to the 15 mm×150 mm face of a rigid polyvinyl chloride test bar which is 6 mm thick. The tape is pressed into place by rolling once with a 6.8 kg roller. The liner is then removed from the tape, and the exposed surface attached to a freshly painted steel panel which is 100 mm×300 mm. Four test bars are attached, in two rows, in the lengthwise direction of the steel panel, with one end of each test bar extending beyond the end of the panel approximately 2.5 cm. After rolling the test panel with a 6.8 kg roller at a rate of 300 mm/min, the panel is allowed to dwell for 3 days at ambient temperature. The specimen is then conditioned at −30° C. for approximately 12 hours in the cold chamber, which houses the cold slam fixture as described above. The test panel is then secured in the fixture, with the test bars and the long dimension of the panel mounted in a horizontal direction.

The following test procedure was designed so that some quantitative estimate of cold slam performance could be obtained, rather than simply a pass-fail rating.

The cold slam test is conducted by raising the hinged "door" to a predetermined angle, and releasing it, allowing it to strike the frame and expose the test panel to a cold shock. Ten slams are conducted at each of the five possible slam angles. The slam angle and the number of the slam (1–10) during which any of the four vinyl bars becomes delaminated or detached is recorded. A slam angle of 23 degrees is used initially. If there has been no failures after ten slams at this angle, the angle is increased to 45 degrees. This procedure is repeated until all test bars become detached, or until ten slams at the 180 degree slam angle has been conducted. If failure of one or more bars does occur at a specific stage during the initial ten slams, an additional 10 slams is conducted at that stage before advancing to the next slam angle. The results are recorded by documenting the door slam angle/stage and slam number in which delamination begins, or failure occurs. Numerical designation in the form of stages 1–5 correspond to door slam angles of 23, 45, 68, 90 and 180 degrees respectively. For example, for Example 4, the designation "2,3" refers to at least one failure occuring during stage 2, and the remainder of the failures occuring during stage 3.

The following examples are to be considered as illustrative in nature, and are not limiting in any way. The scope of the invention is that which is defined in the claims only.

EXAMPLES

The following terminology, abbreviations and trade names are used in the examples:

Glossary

Reference Construction—One of various high performance acrylic tape constructions of the prior art provided to show comparative performance of such formulations.

Comparative—A tape having the same base formulation as key tapes of the invention, but containing no acrylic monomer, provided to demonstrate the effect of acrylic monomer and especially acidic monomer incorporation.

Abbreviations

SR—500 - a silicone resin primer available from General Electric
NVP - N-vinyl-2-pyrrolidone
$T_g$ - glass transition temperature
RT - room temperature
POP - pop off panel, no residue remaining
AD - adhesive delamination
tr - trace
MW - number average molecular weight
Solv - solvent
Wt % - weight percent
AVG - average Inmont E—14 - High solids clear topcoat enamel available from BASF/Inmont
DuPont 50 J - Medium solids enamel available from E. I. DuPont

Preparation of Functional Silicones

Difunctional polysiloxanes terminated on both ends with ethylenically unsaturated groups which can be used according to the present invention were prepared as described below. These are identified as 5K ACMAS, 10K ACMAS, 13K ACMAS, 21K ACMAS, 35K ACMAS, 52K ACMAS, 35K ACMS, 35K MACMAS, 20K MAHAS, 35K CACMS, 35K MAUS, and 30K MeStUS, wherein the number denotes molecular weight in thousands and the letters indicate the type of functionality as defined below.

Abbreviations

MAUS - methacryloxyurea siloxane
ACMAS - acrylamidoamido siloxane
MACMAS - methacrylamidoamido siloxane
MeStUS - α-methylstyrylurea siloxane
ACMS - acrylamido siloxane
CACMS - β-Carboxyacrylamidosiloxane
MAHAS - methacryloxyhydroxyamino siloxane Synthesis of difunctional precursors for all free-radically polymerizable siloxanes useful in this application was performed in the following way:

Aminopropyl-Terminated Polydimethylsiloxane

A 1 liter 3-necked round bottom flask equipped with thermometer, mechanical stirrer, dropping funnel and dry argon inlet was charged with 4.25 g bis(3-aminopropyl) tetramethyldisiloxane and 21.25 g of octamethylcyclotetrasiloxane (D$_4$) which had been previously purged for 10 minutes with argon. The flask contents were heated to 80° C. with an oil bath, and a trace (about 0.03 to 0.05 g) of catalyst—anhydrous 3-aminopropyl dimethyl tetramethylammonium silanolate—was added via a spatula. The reaction was stirred at 80° C. and after 30 minutes of stirring had become quite viscous. Vapor phase chromatography (VPC) showed that the end-blocker had completely disappeared. To the resultant reaction mixture (which consisted of a 1,500 molecular weight polysiloxane with aminopropyl endgroups, cyclic siloxanes and active catalyst) was added dropwise over a six hour period 656 g of argon-purged D$_4$, resulting in a further rise in the viscosity. Heating of the reaction flask contents at 80° C. was continued overnight. The catalyst was decomposed by heating at 150° C. for ½ hour, and the product was stripped at 140° C. at 0.1 mm pressure until no more volatiles distilled (ca. 1½ hour), resulting in 585 g of a clear, colorless, viscous oil (a yield of 86% of theoretical). The molecular weight of the product determined by acid titration was 35,088. Using this procedure, but varying the ratio of endblocker to D$_4$, aminopropyl-terminated polydimethylsiloxanes with molecular weights of 5,000, 10,000, 13,000, 20,000, 21,000, 35,000, 52,000 and 55,000 were prepared.

5K, 10K, 13K, 20K, 21K, 35K, 52K, 55K, ACMAS

Polydimethylsiloxane terminated on both ends with acrylamidoamido groups and having an average molecular weight of about 35,000 (35K ACMAS) was prepared by thoroughly mixing 350 g (0.01 mole) of aminopropyl-terminated polydimethylsiloxane prepared according to the above description with 2.8 g (0.02 mole)

of vinyldimethylazlactone (VDM), prepared as described in U.S. Pat. No. 4,777,276 (Rasmussen et al.) incorporated by reference herein, at room temperature.

The viscosity of the reaction mixture increased as the reaction progressed. The number average molecular weight of the difunctional polysiloxane was determined by acid titration of the precursor and was confirmed by gel permeation chromatography (GPC) analysis before and after capping with VDM. 5K ACMAS, 10K ACMAS, 13K ACMAS, 21K ACMAS, 52K ACMAS, 55K ACMAS were prepared by using aminopropyl-terminated polydimethylsiloxane precursors with molecular weights of 5,000, 10,000, 13,000, 21,000, 52,000, 55,000 respectively, prepared according to the above-described procedure.

35K MAUS/35K MACMAS/35K MeStUS/35K ACMS

Other free-radically polymerizable siloxanes were prepared by reacting the 35,000 molecular weight aminopropyl-terminated polydimethylsiloxane prepared according to the above-described method with other capping agents, such as with isocyanatoethyl methacrylate, commercially available from Showa Rhodia, isopropenyl dimethyl azlactone, prepared as described in U.S. Pat. No. 4,777,276 (Rasmussen et al.) incorporated by reference herein, and with m-isopropenyl-α,α-dimethyl benzyl isocyanate available from American Cyanamid under the trade name m-TMI ™, at room temperature to form polysiloxanes with methacryloxyurea (35K MAUS), methacrylamidoamido (35K MACMAS), and α-methylstyryl urea (35K MeStUS) groups on both ends, respectively. 35,000 MW acrylamido functional siloxane (35K ACMS) was prepared by adding a solution of 0.80 g (5.5 mmol) acryloyl ethyl carbonic anhydride (prepared from ethyl chloroformate and acrylic acid according to the method of R. Hatada and H. Kondo, Bull. Chem. Soc. Japan, 41 (10),2521 (1968) incorporated by reference herein) in 5 mL CH$_2$Cl$_2$ to 87.5 g (2.5 mmol) 35,000 MW degassed aminopropyl-terminated polydimethylsiloxane (prepared according to the above-described method) in a 250 mL round bottom flask, stirring 30 minutes at room temperature under nitrogen, and distilling off solvent on a rotary evaporator.

20K MAHAS

A polysiloxane with methacryloxyhydroxyamino (20K MAHAS) groups on both ends was prepared utilizing the procedure described in Example 4 of U.S. Pat. No. 4,293,397, incorporated by reference herein. 40.34 g (2 mmol) degassed 20,171 MW amine terminated polydimethylsiloxane synthesized as described above was placed in a 250 mL 2-neck flask containing 1.47 g (10.3 mmol) glycidyl methacrylate and 9.4 mg methoxyhydroquinone. An overhead stirrer and a nitrogen inlet were attached, the headspace was flushed with nitrogen, and the reaction mixture was stirred for 65 hours at 60° C.

35K CACMS 35,000 MW beta-carboxyacrylamido functional siloxane (35K CACMS) was prepared by charging 99.9 g (2.9 mmol) degassed 35,000 MW aminopropyl-terminated polydimethylsiloxane (prepared according to the above-described method), 0.62 g (6.3 mmol) maleic anhydride, 1.15 g (11.4 mmol) triethyl amine, and 125 g methylene chloride into a 500 mL round bottom flask under nitrogen, stirring 18.5 hours at room temperature, then refluxing 2.5 hours at 40° C., and distilling off solvent and triethyl amine on a rotary evaporator.

13K ACMASmac n-Butyl lithium (13.3 mL, 2.5 M) was added to 9.8 g octamethylcyclotetrasiloxane (D$_4$) under argon to form lithium silanolate initiator. After stirring for 30 minutes, a solution of 500 g hexamethylcyclotrisiloxane (D$_3$) in 1500 g dry tetrahydrofuran was added and the reaction stirred at room temperature for 18 hours. To the resulting viscous syrup was added 4.7 g 3-aminopropyl-dimethyl fluorosilane terminating agent.

The fluorosilane terminating agent was prepared according to the following method: a 500 mL, 3-neck round bottom flask was charged with 49.6 g 1,3-bis(3-aminopropyl)tetramethyldisiloxane, 29.6 g ammonium fluoride, and 300 mL cyclohexane. While heating under reflux, water was removed by means of a Dean-Stark trap. After 18 hours, 4.4 mL of water had been collected, and the clear, colorless solution was transferred while warm to a 500 mL 1-neck round bottom flask. The solvent was distilled on a rotary evaporator to provide 165 grams of white solid. This was dissolved in 200 mL of methylene chloride, 30 g of hexamethyldisilazane was added, and the mixture was stirred and heated under reflux for 5 hours. The flask was fitted for distillation and the solvent removed under aspirator vacuum. The product was distilled (boiling point of 70° C.) at aspirator vacuum to provide 3-aminopropyl-dimethyl fluorosilane as a clear, colorless oil. The yield was 54 g (100%), which was determined to be pure by vapor phase chromatography. The structure was confirmed by NMR spectroscopy.

After the fluorosilane terminating agent was added, the viscosity rapidly decreased. After stirring for 2 hours, the solvent was distilled on a rotary evaporator. The product was filtered to remove lithium fluoride and provided 516 g of silicone monoamine as a clear, colorless oil. Titration with 0.1 N HCl gave a number average molecular weight, $\overline{M}_n$, of 13,000 (theoretical $\overline{M}_n = 15,000$). 49.6g (3.8 mmol) of this monoamine was reacted with 0.52 g (3.7 mmole) VDM at room temperature to yield monofunctional acrylamidoamido-terminated polydimethylsiloxane (13K ACMASmac).

The vinyl monomers used in preparation of the hybrid PSAs described in the Examples below are listed below along with their source.

| Abbrev. | Monomers Monomer | Source |
|---|---|---|
| AA | acrylic acid | Rohm and Haas |
| IOA | isooctyl acrylate | 1 |
| MAA | methacrylic acid | Eastman Kodak |

1) Prepared by esterification of isooctyl alcohol (Exxon) with acrylic acid.

EXAMPLES 1 THROUGH 4 AND COMPARATIVE EXAMPLE 1

These Examples show the performance of a 100% silicone PSA generated from a 1/1.2 mixture of gum (35K ACMAS) and MQ resin (Comparative Example 1) and compare it to the performance of hybrid PSAs prepared by formulating this same gum/resin mixture with varying amounts of methacrylic acid.

COMPARATIVE EXAMPLE 1

A homogeneous 73.3% solids solution of silicone gum and resin (in a ratio of 1/1.2) also containing photoinitiator, was prepared by adding 100 g of 35K ACMAS prepared according to the above-described method and 3 g Darocur TM 1173 2-hydroxy-2-methyl-1-phenylpropan-1-one (available from EM Industries, Inc.) to 200 g of a 60% solids solution of MQ resin in toluene (available from GE Silicones as catalog #SR 545).

After stirring, this mixture was coated and cured between two liners consisting of biaxially-oriented 0.05 mm thick polyethylene terephthalate (PET) film dual liners the facing surfaces of which had been coated with a low adhesion release agent. The knife coater setting was adjusted to provide a uniform coating thickness of 0.05 mm. The formulation was polymerized by exposure to a bank of low intensity blacklight UV lamps, with exposure time of 10 minutes (1200 mJ/cm$^2$) for 0.05 mm thick samples. One liner was removed. The samples were placed in a forced air oven at 65° C. for 15 minutes to remove toluene solvents. The pressure-sensitive adhesive film was laminated to a primed acrylic foam core. A foam-like acrylic core material was prepared as taught in U.S. Pat. No. 4,330,590 (Vesley) incorporated herein by reference, from a mixture of 87.5 parts IOA, 12.5 parts AA and 0.04 parts of 2,2-dimethoxy-2-phenyl acetophenone (Irgacure TM 651). To a partially polymerized syrup made from this mixture was added an additional 0.1 part Irgacure TM 651, 0.05 part 1,6-hexanediol diacrylate, 2.0 parts hydrophilic silica, and 8.0 parts glass microbubbles which have an average diameter of 50 microns and a density of 0.15 g/cm$^3$. The sample was then degassed an cured by exposure to a bank of UV lamps. Total exposure was approximately 400 mJ/cm$^2$. The thickness of the resulting core was about 1.0 mm. A primer was applied to the acrylic core and dried at 175° F. for 15 minutes in a forced air oven. The pressure-sensitive adhesive transfer tape was then heat laminated to the primed core. The resulting attachment tape construction was then evaluated in several test modes, including 90 degree peel adhesion following selected dwell times/temperatures. Test substrates included BASF/Inmont E-14 and Ford 50-J automotive paints. Cold slam analysis was also conducted. Results are included in Table I.

EXAMPLE 1

12.96 g of the 73.3% solids solution (containing 9.5 g of solids) of the 1/1.2 35K ACMAS/MQ resin mixture (also containing photoinitiator) prepared in Comparative Example 1 was mixed with 0.5 g methacrylic acid. The resulting clear solution was cured, heated to remove solvent, laminated to a primed acrylic core base material and tested as described above for Comparative Example 1, with results presented in Table I.

EXAMPLES 2 THROUGH 4

Following the procedure of Example 1, clear solutions were prepared from 12.35 g of the 1/1.2 35K ACMAS/MQ resin (solids) solution in toluene and 1.0 g MAA (Example 2), 1.59 g MAA (Example 3), 2.25 g MAA (Example 4), cured, dried and laminated to a primed acrylic core base material, and tested with results presented in Table I.

EXAMPLES 5 THROUGH 7

These examples illustrate the use of solventless adhesive formulations. MQ resin solution in toluene was diluted with IOA and the toluene was stripped under vacuum leaving a solution of MQ resin in IOA (58.8 wt%).

8 g 55K ACMAS was mixed with 27.21 g of MQ resin solution in IOA and an additional amount of IOA was added along with acid (AA or MAA) to give formulations with a silicone/MQ resin ratio of 1/2.0 and various concentrations of acrylic monomers:

10.39 g additional IOA/2.4 g AA (Example 5) (90/10 IOA/AA);

10.39 g additional IOA/2.4 g MAA (Example 6) 90/10 IOA/MAA);

9.19 g additional IOA/3.6 g MAA (Example 7) (85/15 IOA/MAA).

Reference Construction R-1

A foam core (1.0 mm thick) was prepared as described in Comparative Example 1 (according to Vesley U.S. Pat. No. 4,330,590). A pressure-sensitive adhesive transfer tape (0.05 mm thick) was laminated to a primed core, using a hard rubber roller.

The transfer tape was prepared as follows:

To a 1 liter mixing vessel was charged 87.4 parts IOA, 53.2 parts methyl acylate, 11.4 parts AA, 248 parts ethyl acetate and 0.456 parts Vazo TM 64 (AIBN) initiator. This mixture was purged with nitrogen for two minutes (1 liter/min flow) and placed in a rotary water bath at 55° C. for 24 hours. The inherent viscosity of the product was 1.8 dL/g in ethyl acetate. The solution was diluted with toluene to 20.7% solids, and 0.5 part of a crosslinker was added. This mixture was reverse-roll coated and cured in a forced air oven. Testing occured as for the Examples above with results presented in Table I.

TABLE I

| DESCRIPTION: | COMPARATIVE 1 | 1 | 2 | 3 | 4 | 5 | 6 | 7 | REF. NO. R-1 |
|---|---|---|---|---|---|---|---|---|---|
| WT % ACID | 0 | 5 | 10 | 15 | 20 | 5 | 5 | 7.5 | |
| TYPE ACID | — | MAA | MAA | MAA | MAA | AA | MAA | MAA | |
| TYPE SILICONE: | ACMAS | ACMAS | ACMAS | ACMAS | ACMAS | ACMAS | ACMAS | ACMAS | |
| MW SILICONE: | 35K | 35K | 35K | 35K | 35K | 55K | 55K | 55K | |
| GUM/MQ RESIN | 1/1.2 | 1/1.2 | 1/1.2 | 1/1.2 | 1/1.2 | 1/2.0 | 1/2.0 | 1/2.0 | |
| WT % IOA | 0 | 0 | 0 | 0 | 0 | 45 | 45 | 42.5 | |
| IOA/ACID RATIO: | — | — | — | — | — | 90/10 | 90/10 | 85/15 | |
| 90° PEEL ADHESION; E-14 3 DAY RT DWELL AVG LOAD (N/dm) | 131 | 468 | 287 | 193 | | 361 | 436 | 162 | 215 |
| 90° PEEL ADHESION; 50-J 3 DAY RT DWELL AVG LOAD (N/dm) | | 422 | 250 | 155 | | | | 381 | |
| 90° PEEL ADHESION; E-14 | | 341 | | | | 236 | 377 | | 101 |

TABLE I-continued

| DESCRIPTION: | COMPARATIVE 1 | 1 | 2 | 3 | 4 | 5 | 6 | 7 | REF. NO. R-1 |
|---|---|---|---|---|---|---|---|---|---|
| 2 MIN. RT DWELL AVG LOAD (N/dm) 90° PEEL ADHESION; E-14 | | 425 | | | | 271 | 381 | | 160 |
| 1 HR/RT DWELL AVG LOAD (N/dm) 90° PEEL ADHESION; E-14 | | | | | | 363 | 409 | | 206 |
| 1 DAY/RT AVG LOAD (N/dm) 90° PEEL ADHESION; E-14 | | 422 | | | | 298 | 359 | | 241 |
| 1 HR/158F DWELL AVG LOAD (N/dm) COLD SLAM/(−28° F.); E-14 | | | | | | | | | |
| DELAM AT STAGE: | 3 | NONE | 3 | | 2 | | | | 0 |
| FAILURE AT STAGE: | 3, 4 | NONE | 4 | | 2, 3 | | | | 2 |
| COLD SLAM/(−22° F.); E-14 DWELL TIME - 16 HR/RT | | | | | | | | | |
| DELAM AT STAGE: | | | | | | 0 | 0 | | 0 |
| FAILURE AT STAGE: | | | | | | 2 | 2 | | 1 |
| STATIC SHEAR/150F/500G E-14 PAINT/1 DAY RT DWELL | | | | | | | | | |
| MIN TO FAILURE | 2099 | 10,000+ | 10,000+ | | 346 | | | | |
| FAIL MODE; IF NOT POP | POP/RES | — | — POP/AD | | AD | | | | |

Other embodiments of this invention will be apparent to those skilled in the art from a consideration of this specification or from the practice of the invention disclosed herein. Various omissions, modifications, and changes to the principles described herein may be made by one skilled in the art without departing from the true scope and spirit of the invention which is indicated by the following claims.

What is claimed is:

1. A pressure-sensitive adhesive tape comprising:
(a) a pressure-sensitive adhesive layer comprising a polymerized pressure sensitive adhesive composition wherein said pressure sensitive adhesive composition comprises:
(I) about 25 to about 99 weight percent of polymer of the formula

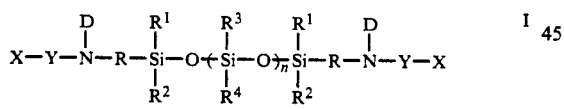

wherein:
X are monovalent moieties having ethylenic unsaturation which can be the same or different;
Y are divalent linking groups which can be the same or different;
D are monovalent moieties which can be the same or different selected from the group consisting of hydrogen, an alkyl group of 1 to about 10 carbon atoms, aryl, and substituted aryl;
R are divalent hydrocarbon groups which can be the same or different;
$R^1$ are monovalent moieties which can be the same or different selected from the group consisting of alkyl, substituted alkyl, aryl, and substituted aryl;
$R^2$ are monovalent moieties which can be the same or different selected from the group consisting of alkyl, substituted alkyl, aryl, and substituted aryl;
$R^3$ are monovalent moieties which can be the same or different selected from the group consisting of alkyl, substituted alkyl, vinyl, aryl, and substituted aryl;
$R^4$ are monovalent moieties which can be the same or different selected from the group consisting of alkyl, substituted alkyl, vinyl, aryl, and substituted aryl;
n is an integer of about 200 to about 1000;
(II) about 1 to about 75 weight percent free radically polymerizable vinyl monomer which is capable of copolymerizing with the polymer wherein said free radically polymerizable monomer comprises:
(i) about 5 to about 100 parts by weight of an acidic monomer selected from the group consisting of methacrylic acid, acrylic acid, and mixtures thereof;
(ii) correspondingly about 0 to about 95 parts by weight of an acrylate monomer selected from the group consisting of esters of acrylic acid comprising 4 to 21 carbon atoms and esters of methacrylic acid comprising 5 to 21 carbon atoms and mixtures thereof; based upon 100 parts total by weight of said free radically polymerizable monomer;
wherein the weight percentages set forth in elements (I) and (II) are based upon the total weight of the polymer of element (I) plus the monomer of element (II); and
(III) about 80 to about 200 parts per 100 parts by weight of the polymer of element (I) of a silicate MQ tackifying resin; and
(b) a foam layer which is coated on at least one side with the adhesive layer.

2. The tape of claim 1 wherein said pressure sensitive adhesive composition further comprises at least one of the additives selected from the group consisting of a filler, a crosslinker, and a free radical initiator.

3. The tape of claim 1 wherein said pressure sensitive adhesive composition further comprises about 0.1 to about 5 weight percent of an initiator based upon the weight of said composition.

4. The tape of claim 3 wherein said initiator is a photoinitiator.

5. The tape of claim 1 wherein said pressure sensitive adhesive composition further comprises about 2 to about 30 weight percent, based upon the weight of the adhesive composition, of polymer of the formula

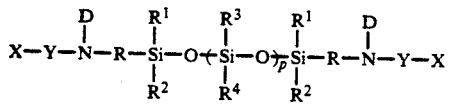   Ia wherein p is an integer of about 35 to about 199; and X, Y, D, R, $R^1$, $R^2$, $R^3$, and $R^4$ are as defined in claim 1.

6. The tape of claim 1 wherein X comprises

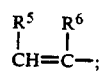

$R^5$ is selected from the group consisting of hydrogen and —COOH; $R^6$ is selected from the group consisting of hydrogen, methyl, and —CH$_2$COOH; n is an integer of about 200 to about 1000; R is selected from the group consisting of alkylene of one to about 12 carbon atoms, alkyl arylene, and arylene; $R^1$ and $R^2$ are independently selected from the group consisting of alkyl of one to about 12 carbon atoms, substituted alkyl of one to about 12 carbon atoms, aryl, and substituted aryl; $R^3$ and $R^4$ are at least 50% methyl with the remainder selected from the group consisting of alkyl of about 2 to about 12 carbon atoms, substituted alkyl of about 2 to about 12 carbon atoms, vinyl, aryl, and substituted aryl; and D is hydrogen.

7. The tape of claim 1 wherein n is an integer of about 200 to about 1000, R is alkylene of one to about 12 carbon atoms, and $R^1$, $R^2$, $R^3$, and $R^4$ are methyl.

8. The tape of claim 1 wherein X comprises

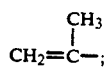

Y comprises

D=H; R comprises —CH$_2$CH$_2$CH$_2$—; and $R^1$, $R^2$, $R^3$, and $R^4$ each comprise —CH$_3$.

9. The tape of claim 1 wherein X comprises CH$_2$=CH—; Y comprises

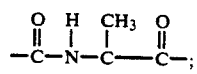

D=H; R comprises —CH$_2$CH$_2$CH$_2$—; and $R^1$, $R^2$, $R^3$, and $R^4$ each comprise —CH$_3$.

10. The tape of claim 1 wherein X comprises CH$_2$=CH—; Y comprises

D=H; R comprises —CH$_2$CH$_2$CH$_2$—; and $R^1$, $R^2$, $R^3$, and $R^4$ each comprise —CH$_3$.

11. The tape of claim 1 wherein X comprises

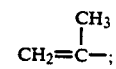

Y comprises

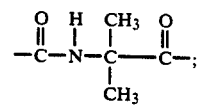

D=H, R comprises —CH$_2$CH$_2$CH$_2$—; and $R^1$, $R^2$, $R^3$ and $R^4$ each comprise —CH$_3$.

12. The tape of claim 1 wherein X comprises

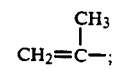

Y comprises

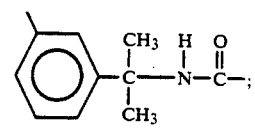

D=H, R comprises —CH$_2$CH$_2$CH$_2$—; and $R^1$, $R^2$, $R^3$ and $R^4$ each comprise —CH$_3$.

13. The tape of claim 1 which further comprises about 2 to about 30 weight percent, based upon the total weight of said composition, of a compound of the formula

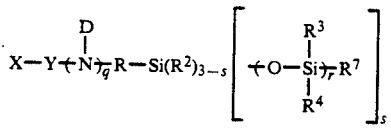   IX wherein q is an integer selected from the group consisting of 0 and 1; s is an integer selected from the group consisting of 1, 2 and 3; r is an integer of about 35 to about 700; $R^7$ are monovalent moieties which can be the same or different selected from the group consisting of alkyl, substituted alkyl, alkoxy, alkylamino, hydroxyl, aryl, and substituted aryl; and X, Y, D, R, $R^2$, $R^3$, and $R^4$ are as defined in claim 1.

14. The tape of claim 1 wherein said pressure sensitive adhesive composition further comprises about 0.05 to about 2 weight percent of a multifunctional acrylate monomer based upon the total weight of said composition.

15. The tape of claim 1 wherein said pressure sensitive adhesive composition further comprises about 5 to about 100 parts by weight tackifier per 100 parts by weight free radically polymerizable vinyl monomer.

16. The tape of claim 15 wherein said tackifier is selected from the group consisting of rosin acids, rosin esters, synthetic aromatic resins, synthetic aliphatic resins, terpene resins, and mixtures thereof.

17. The tape of claim 1 wherein said pressure sensitive adhesive composition further comprises inert gas bubbles dispersed throughout.

18. The tape of claim 1 wherein said pressure sensitive adhesive composition further comprises microbubbles selected from the group consisting of glass microbubbles, plastic microbubbles, and mixtures thereof.

19. The tape of claim 1 wherein said pressure sensitive adhesive composition further comprises about 0.5 to about 15 weight percent of silica filler based upon the total weight of said composition.

20. A pressure-sensitive adhesive tape comprising:
(a) a pressure-sensitive adhesive layer comprising a polymerized pressure sensitive adhesive composition wherein said pressure sensitive adhesive composition comprises:
(I) about 80 to about 95 weight percent of polymer of the formula

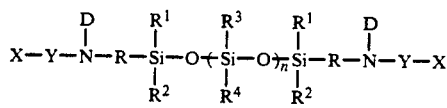

wherein:
X are monovalent moieties having ethylenic unsaturation which can be the same or different;
Y are divalent linking groups which can be the same or different;
D are monovalent moieties which can be the same or different selected from the group consisting of hydrogen, an alkyl group of 1 to about 10 carbon atoms, aryl, and substituted aryl;
R are divalent hydrocarbon groups which can be the same or different;
$R^1$ are monovalent moieties which can be the same or different selected from the group consisting of alkyl, substituted alkyl, aryl, and substituted aryl;
$R^2$ are monovalent moieties which can be the same or different selected from the group consisting of alkyl, substituted alkyl, aryl, and substituted aryl;
$R^3$ are monovalent moieties which can be the same or different selected from the group consisting of alkyl, substituted alkyl, vinyl, aryl, and substituted aryl;
$R^4$ are monovalent moieties which can be the same or different selected from the group consisting of alkyl, substituted alkyl, vinyl, aryl, and substituted aryl;
n is an integer of about 200 to about 1000;
(II) about 5 to about 20 weight percent free radically polymerizable vinyl monomer which is capable of copolymerizing with the polymer wherein said free radically polymerizable monomer comprises:
(i) about 10 to 100 parts by weight of an acidic monomer selected from the group consisting of methacrylic acid, acrylic acid, and mixtures thereof;
(ii) correspondingly about 0 to 90 parts be weight of an acrylate monomer selected from the group consisting of methyl acrylate, ethyl acrylate, propyl acrylate, butyl acrylate, hexyl acrylate, heptyl acrylate, isooctyl acrylate, and mixtures thereof; based upon the weight of said free radically polymerizable monomer;
wherein the weight percentages set forth in elements (I) and (II) are based upon the total weight of the polymer of element (I) plus the monomer of element (II); and
(III) about 80 to about 150 parts per 100 parts by weight of the polymer of element (I) of a silicate MQ tackifying resin; and (b) a foam layer which is coated on at least one side with the adhesive layer.

21. A pressure-sensitive adhesive tape according to claim 1 wherein said foam layer comprises an ultraviolet-radiation polymerized acrylic copolymer.

22. A pressure-sensitive adhesive tape according to claim 21 wherein said ultraviolet-radiation polymerized acrylic copolymer comprises
a) from about 80 parts to about 99 parts of an alkyl acrylate monomer, the alkyl groups of which have an average of 4 to 14 carbon atoms, and
b) correspondingly, from about 20 parts to about 1 part of a monoethylenically unsaturated strongly polar copolymerizable monomer, and
c) from about 0.01 part to about 1 part of a photoinitiator.

23. A pressure-sensitive adhesive tape having a foam layer according to claim 21 wherein said ultraviolet-radiation polymerized acrylic copolymer comprises from about 95 parts to about 99 parts by weight of said alkyl acrylate monomer, and correspondingly, from about 5 parts to about 1 part by weight of said strongly polar copolymerizable monomer.

24. The pressure-sensitive adhesive tape of claim 20 wherein said alkyl acrylate monomer is isooctyl acrylate.

25. The pressure-sensitive adhesive tape of claim 20 wherein said foam layer comprises a polymeric material selected from the group consisting of polyacrylates, neoprene, polyolefin, and polyurethane.

26. The tape of claim 1 wherein the free radically polymerizable monomer comprises about 5 to about 15 parts by weight of said acidic monomer and correspondingly about 95 to about 85 parts by weight of said acrylate monomer.

27. The tape of claim 1 wherein the free radically polymerizable monomer comprises about 95 to about 100 parts by weight of said acidic monomer and correspondingly about 5 to about 0 parts by weight of said acrylate monomer.

28. The tape of claim 1 wherein the free radically polymerizable monomer comprises about 100 parts by weight of said acidic monomer.

29. The pressure-sensitive adhesive tape of claim 25 wherein said polyolefin is selected from the group consisting of polyethylene and polypropylene.

* * * * *

UNITED STATES PATENT AND TRADEMARK OFFICE
CERTIFICATE OF CORRECTION

PATENT NO.: 5,264,278

DATED: November 23, 1993

INVENTOR(S): Mieczyslaw H. Mazurek et al.

It is certified that error appears in the above-identified patent and that said Letters Patent is hereby corrected as shown below:

Col. 7, line 21, replace "M" with --$M^+$--.

Col. 9, line 12, "-$CH_2$:$CH_2$:$CH_2$-;" should be -- -$CH_2CH_2CH_2$-; --

Col. 11, line 46, replace "diacryalte" with --diacrylate--.

Col. 16, lines 28 & 29, replace "®" with --™--.

Col. 21, line 34, replace "an" with --and--.

Col. 28, line 5, replace "be" with --by--.

Signed and Sealed this

Twenty-fourth Day of September, 1996

Attest:

BRUCE LEHMAN

*Attesting Officer*　　　*Commissioner of Patents and Trademarks*